Patented June 6, 1944

2,350,670

UNITED STATES PATENT OFFICE 2,350,670

AMMUNITION PRIMING COMPOSITION

Willi Brün and Philip H. Burdett, Bridgeport, Conn., assignors to Remington Arms Company, Inc., a corporation of Delaware No Drawing. Application June 14, 1941, Serial No. 398,116

4 Claims. (Cl. 52—4)

This invention relates to the acid lead salt of di-nitroso-resorcinol, especially to its preparation. More particularly it appertains to its use in priming mixtures for ammunition.

The primary objects of this invention were to produce the hitherto unknown acid lead salt of 2:4-di-nitroso-resorcinol and to compound efficient ignition compositions containing the same. A general advance in the art, and other objects which will appear hereinafter, are also contemplated.

The acid lead salt of di-nitroso-resorcinol, assuming the cyclo-hexene-di-oxime formula, probably has the structure:

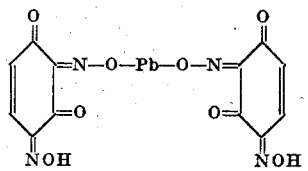

It can be prepared (the parts being given by weight) by dissolving, with stirring, 37 parts (0.2 mol) of di-nitroso-resorcinol monohydrate in 1700 parts of water containing 8 parts (0.2 mol) of sodium hydroxide in solution, heating the resultant solution to 70° C., and adding drop-wise 35 parts (approximately 0.1 mol) of lead nitrate dissolved in 200 parts of water. Isolation of the desired product is brought about by cooling (with stirring) the reaction mixture and filtering off the precipitated dark green, amorphous, easily broken up salt. Satisfactory purification is obtained by washing repeatedly with water, followed by a final ethyl alcohol wash and air drying. Check samples of such a product gave upon analysis lead contents of 38.27% and 38.25%. According to theory the content is 38.30%.

Except for minor changes in concentration and temperature, as necessitated by differences in solubilities, the acid salts of other heavy metals and the acid salts of the alkaline earths are prepared in a like manner. By "heavy metals" is meant metals having the property of being qualitatively precipitated by hydrogen sulfide or ammonium sulfide; while the "alkaline earths" are qualitatively precipitated by ammonium carbonate and ammonium phosphate.

For example, in preparing the acid silver, acid cadmium and acid barium salts, the procedural steps are the same, and the proportions of materials for the solutions to be added to the solution of 37 parts (0.2 mol) of di-nitroso-resorcinol monohydrate and of 8 parts of sodium hydroxide (0.2 mol) in 1700 parts of water are:

AgNO$_3$ -------- 34 parts (approximately 0.2 mol)
CdSO$_4$·8/3H$_2$O_ 26 parts (approximately 0.1 mol)
BaCl$_2$·2H$_2$O --- 24 parts (approximately 0.1 mol)

The structural formulae for these last mentioned acid salts are:

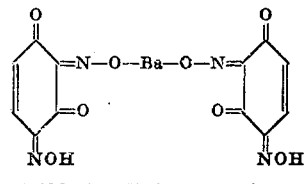

Acid barium di-nitroso-resorcinate

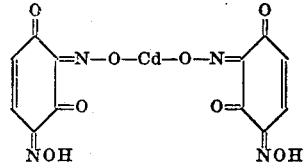

Acid cadmium di-nitroso-resorcinate

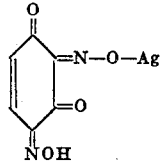

Acid silver di-nitroso-resorcinate

The brown, amorphous acid cadmium salt appears to carry one mol of water of crystallization. The acid barium salt is brown and amorphous. The acid silver salt is dark green, almost black, and its filter cake is difficult to break up.

Typical examples of priming mixtures employing the new compounds are:

|  | Parts | Parts | Parts |
|---|---|---|---|
| Lead styphnate | 40 | 40 | 40 |
| Tetrazene | 2 | 2 | 2 |
| Lead nitrate | 30 | 30 | 30 |
| Powdered glass | 20 | 20 | 20 |
| Acid lead di-nitroso-resorcinate | 8 |  |  |
| Acid barium di-nitroso-resorcinate |  | 8 |  |
| Acid cadmium di-nitroso-resorcinate |  |  | 8 |

Ammunition priming mixtures as ordinarily made comprise a number of ingredients which can be grouped primarily into three classes. These are fuel (material to be oxidized), oxidizer (material to furnish the oxygen necessary for oxidizing the fuel) and combustion initiator (percussion sensitive material having the function of starting the reaction between the fuel and the oxidizer substances). Other combustion initiators, oxidizers (particularly the non-corrosive type) and fuels may be used in conjunction with the acid di-nitroso-resorcinol salts of this invention, and the proportions of the ingredients of the ignition mixtures may vary widely. A practical range of proportions of the acid lead salt of di-nitroso-resorcinol is from about 1% to 15% of the priming mixture.

The acid heavy metal salts of di-nitroso-resorcinol being broadly new, the appended claims are to be broadly construed.

We claim:

1. A priming mixture for ammunition containing 1% to 15% of the acid lead salt of di-nitroso-resorcinol.

2. An ignition mixture containing approximately:

| | Per cent |
|---|---|
| Acid lead di-nitroso-resorcinate | 8 |
| Lead styphnate | 40 |
| Tetrazene | 2 |
| Lead nitrate | 30 |
| Glass | 20 |

3. A priming mixture for ammunition containing 1% to 15% of an acid salt of di-nitroso-resorcinol.

4. A priming mixture for ammunition comprising essentially:

| | Per cent |
|---|---|
| Acid heavy metal di-nitroso-resorcinate | 8 |
| Lead styphnate | 40 |
| Tetrazene | 2 |
| Lead nitrate | 30 |
| Glass | 20 |

WILLI BRÜN.
PHILIP H. BURDETT.